July 15, 1958 H. V. ALLISON 2,842,908
ABRASIVE CUTTING WHEEL MOUNTING AND GUARD
Filed March 29, 1957
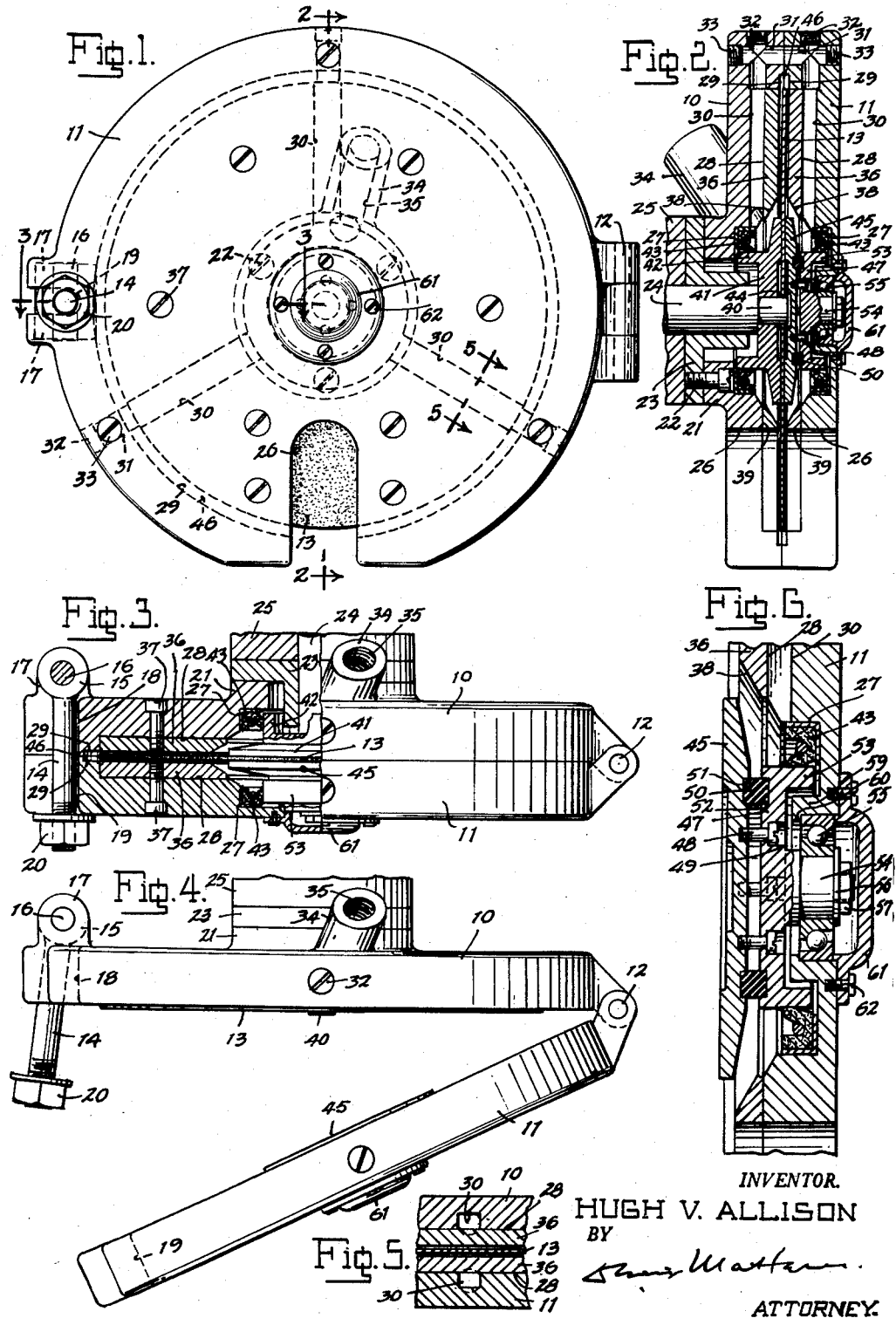
INVENTOR.
HUGH V. ALLISON
BY
ATTORNEY.

United States Patent Office 2,842,908
Patented July 15, 1958

2,842,908

ABRASIVE CUTTING WHEEL MOUNTING AND GUARD

Hugh V. Allison, Fairfield, Conn., assignor to American Chain and Cable Company, Inc., Bridgeport, Conn., a corporation of New York Application March 29, 1957, Serial No. 649,494

4 Claims. (Cl. 51—267)

The present invention relates to an abrasive cutting wheel mounting and guard, particularly for use with relatively thin cutting wheels of large diameter which require frequent renewal.

In the conventional type of wheel mounting and guard the cutting wheel is retained upon a spindle between a pair of flanges secured upon the spindle by a retaining nut, and the guard normally encloses the wheel and its mounting at both sides. In order to remove a cutting wheel it is necessary to first remove or open the guard to permit access to the wheel and its mounting, then remove the retaining nut and flange, and finally remove the wheel from the spindle. The same procedure must be followed in reverse to install a new wheel.

It is an object of the present invention to provide a wheel mounting in which the flange for engaging and retaining the outer side of the cutting wheel is rotatably carried by an outer side of the guard, the latter being adapted to be moved between open and closed positions with respect to an inner side of the guard, and whereby in the closed position the wheel retaining flange is engaged in retaining relation with the cutting wheel, and in the open position is moved out of retaining relation. Thus the cutting wheel may be removed simply by opening the outer side of the guard and slipping the wheel off of the end of the spindle, and, conversely, a replacement cutting wheel may be installed simply by placing it upon the end of the spindle and thereupon closing the outer side of the guard.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a side elevation of a cutting wheel mounting and guard according to the invention;

Fig. 2 is a vertical sectional view taken along the line 2—2 of Fig. 1;

Fig. 3 is a view partially in plan and partially in horizontal section, taken along the line 3—3 of Fig. 1;

Fig. 4 is a plan view showing the guard in its open position for the purpose of removing or installing a cutting wheel;

Fig. 5 is a fragmentary detailed sectional view taken along the line 5—5 of Fig. 1; and Fig. 6 is a fragmentary enlarged sectional view of the outer guard member and the wheel retaining flange rotatably carried thereby.

Referring to the drawings, the guard comprises two members 10 and 11 hingedly connected by a vertical hinge 12 with the cutting wheel 13 between them, and clampingly secured together at the opposite side from the hinge by a clamping bolt 14 having an eye portion 15 pivotally mounted upon a vertical pin 16 between lugs 17—17 formed upon the rearward side of the guard member 10, the bolt being engaged in cutouts 18 and 19 provided in the respective inner and outer guard members 10 and 11 and having a tightening nut 20 screwed upon its outer end and which bears upon the outer face of the guard member 11.

The guard member 10, which is disposed at the inner side of the cutting wheel, is of generally circular outline and is provided with a centrally apertured hub portion 21 secured by bolts 22 to a flanged bearing sleeve 23 in which the wheel carrying spindle 24 is journalled. The guard is suitably non-rotatably supported in a cutting machine for downward movement into cutting relation with the work, and the spindle is keyed to a drive pulley 25 adapted to be driven by a belt connection with a motor.

In the lower part of the guard member 10 there is provided a vertically extending cutout 26 in which the cutting wheel is exposed, the cutout being of suitable width and depth to receive the work being cut during the cutting operation. The face of the inner guard member 10 is provided with a series of stepped recesses, i. e., an inner packing ring receiving annular recess 27, an intermediate wear plate receiving annular recess 28, and an outer water channel annular recess 29. A series of radial grooves 30 is provided in the intermediate recess 28 where they are each connected with a right angular passage 31 extending to the face of the guard member, for a purpose to more fully appear.

The passage 31 is preferably formed by drilling intersecting radial and transverse holes and closing the ends of such drilled holes by screw plugs 32 and 33. A hose connection portion 34 is formed upon the back of the guard member 10, its inlet passage 35 extending diagonally inwardly to the inner face of the member substantially at the junction of the recesses 27 and 28. Within the recess 28 there is fitted a ring-shaped wear plate 36 secured by screws 37, its inner peripheral wall 38 being bevelled and inclined outwardly to the outer face of the plate. The wear plate closes the open sides of the grooves 30 to thus provide radial water conducting passages. The wear plate 36 is provided with a cutout 39 in register with the cutout 26 of the guard member 10.

Upon a reduced end portion 40 of the spindle 24 there is engaged an inner wheel clamping flange member 41, provided at its rearward side with a rearwardly projecting cylindrical flange 42 surrounding the forward end of the flanged bearing sleeve 23 and rotatably engaged at its outer cylindrical surface by a packing ring 43 disposed within the inner recess 27, to thus provide a water seal for the spindle bearing. The reduced spindle end 40 projects beyond the face of the flange member 41 a sufficient distance to be engaged through the central hole 44 of the cutting wheel 13 and the cutting wheel is retained by an outer flange member 45 rotatably carried by the outer guard member 11, as will presently more fully appear.

The outer guard member 11 is substantially identical to the inner guard member 10, except that it is not provided with a water inlet passage 35, and in place of the apertured hub 21 it is provided with a bearing support for the outer wheel engaging flange member 45. In the closed position of the outer guard member, the wear plates 36 are disposed at the opposite sides of the cutting wheel 13, the registering right-angular passages 31 are in communication, and the complementary outer annular recesses 29 form an annular water channel 46 extending about the periphery of the cutting wheel to the work receiving cutout 26.

The flange member 45 is connected for relative axial movement to a circular plate 47 by means of a series of circumferentially spaced headed screws 48 screwed into the opposed face of the flange member 45 and having their heads slidably engaged in pockets 49 in the plate 47, so that the flange and the plate are rotatable together and at the same time the plate may have axial movement. Spring means is interposed between the opposed faces of the flange member and the plate, and is preferably in the form of a resilient rubber ring 50 disposed outwardly of the screws 48 and set in annular recesses 51 and 52 provided in the opposed faces of the flange and plate. This ring normally presses the flange member away from the plate to the limit position determined by the engagement of the heads of the screws 48 in the pockets 49, as seen in Fig. 6, and upon closing of the outer guard member 10 the flange member will engage the surface of the cutting wheel under the yielding pressure of the ring 50 which, as seen in Fig. 2, is compressed in the closed position of the guard member.

The plate 47 is provided with a cylindrical flange 53 which is of the same diameter and is in substantially the opposite relation to the cylindrical flange 42 of the flange member 41, and is engaged by the packing ring 43 of the outer guard member to thus provide a water seal for the rotatable bearing of the flange member 45, the ring 50 providing an additional water seal which prevents access of water to the bearing through the pockets 49 of the plate 47. The plate 47 is provided with a central stud shaft 54 upon which a thrust ball bearing unit 55 is secured by a washer 56 and a nut 57 screwed upon the reduced threaded end 58 of the stud shaft, the bearing unit being set in an annular flange 59 formed centrally of the outer guard member 11 and being retained against a stop shoulder 60 of the flange by a cap member 61 secured by screws 62 upon the outer side of the outer guard member.

In operation the cutting wheel is rotated at relatively high cutting speed, and water or other coolant liquid under pressure is fed to the annular space surrounding the inner wheel clamping flange 41, being directed outwardly by the inclined inner wall 38 of the inner wear plate between the surface of the inner wear plate and the cutting wheel. The effect of pressure and centrifugal force causes the coolant liquid to move over the surface of the wheel to the annular water channel 46 and through which it will flow around the periphery of the wheel to the work receiving opening 26, at which the cutting action takes place, so that in addition to lubricating the wheel surface the liquid is forcibly fed to the point of engagement of the wheel with the work. At the same time the liquid is forced through the radial groove passages 30 of the inner guard member and through the connecting passages 31 and the radial groove passages 30 of the outer guard member to the annular recess surrounding the flange 53 of the plate 47 from which it is forced between the surfaces of the outer wear plate 36 and the cutting wheel to the annular water channel 46.

In order to remove a cutting wheel it is only necessary to unfasten the clamping bolt 14 and swing the outer guard member together with the wheel retaining flange member 45 carried thereby to open position, as seen in Fig. 4, whereupon the cutting wheel may be slipped off of the end of the spindle end 40 and a new cutting wheel slipped into place. Upon closing of the outer guard member the flange member 45 clamps the cutting wheel to the inner flange member 41 under the pressure of the compressed ring 50, the clamping relation being sufficiently tight so that the flange members 41 and 45, the clamped cutting wheel and the rotatable plate member 47 rotate as a unit without slippage.

What is claimed is:

1. A guard and mounting for an abrasive wheel, comprising a spindle, an inner flange member carried by said spindle engageable with the inner side of said wheel, inner and outer complementary guard members enclosing said wheel and having a work receiving opening exposing a portion of said wheel, said outer guard member being movable from a closed to an open position to expose said wheel, and an outer flange member rotatably carried by said outer guard member engageable in the closed position of said outer guard member with the outer side of said wheel to clamp said wheel between said inner and outer flange members and to be rotatable with said wheel, said outer flange member being movable with said outer guard member to open position out of engagement with said wheel.

2. The invention as defined in claim 1, further characterized by hinge means connecting said inner and outer guard members, and releasable means securing said guard members in closed position.

3. The invention as defined in claim 1, further characterized by water passage means for directing water to the surface of said wheel, a bearing carried by said outer guard member rotatably supporting said outer flange member, and water seal means sealing said bearing from said water passage means.

4. The invention as defined in claim 1, further characterized by yieldable means exerting pressure on said outer flange member to bring it into yielding engagement with said wheel in the closed position of said outer guard member.

References Cited in the file of this patent

UNITED STATES PATENTS

| | | |
|---|---|---|
| 1,480,263 | Hoffman | Jan. 8, 1924 |
| 2,462,710 | Ballinger | Feb. 22, 1949 |

FOREIGN PATENTS

| | | |
|---|---|---|
| 122,935 | Sweden | Apr. 13, 1954 |